United States Patent [19]
Westbrook et al.

[11] Patent Number: 5,224,639
[45] Date of Patent: Jul. 6, 1993

[54] LATERAL TRACKING AND POSITIONING SYSTEM FOR FABRICATION OF COMPOSITE SHEET MATERIAL

[75] Inventors: Bruce L. Westbrook, Crescent Springs, Ky.; Mahmoud J. Fakhari, Anaheim Hills, Calif.

[73] Assignee: The Standard Oil Company, Cleveland, Ohio

[21] Appl. No.: 645,463

[22] Filed: Jan. 24, 1991

[51] Int. Cl.5 ............................................. B65H 23/02
[52] U.S. Cl. ........................................... 226/3; 226/17
[58] Field of Search ............................. 226/15, 17, 3

[56] References Cited

U.S. PATENT DOCUMENTS

| | | | |
|---|---|---|---|
| 642,141 | 1/1900 | Lyon | 226/15 |
| 2,170,578 | 8/1939 | Sperry | 226/17 |
| 3,077,000 | 2/1963 | Hulsman et al. | 425/520 |
| 3,147,898 | 9/1964 | Huck | 226/17 |
| 3,323,700 | 6/1967 | Epstein et al. | 226/17 |
| 3,368,726 | 2/1968 | Funk et al. | 226/17 |
| 4,007,865 | 1/1977 | Crandall | 226/17 |
| 4,068,789 | 1/1978 | Young, Jr. et al. | 226/15 |
| 4,567,492 | 1/1986 | Skafvenstedt et al. | 226/17 |
| 5,086,963 | 2/1992 | Pierson | 226/17 |

FOREIGN PATENT DOCUMENTS

| | | | |
|---|---|---|---|
| 947902 | 7/1949 | France | 226/17 |
| 1049986 | 1/1954 | France | 226/17 |
| 63-87463 | 4/1988 | Japan | 226/15 |
| 404331 | 6/1966 | Switzerland | 226/3 |

Primary Examiner—Jay H. Woo
Assistant Examiner—Robert B. Davis
Attorney, Agent, or Firm—Poms, Smith, Lande & Rose

[57] ABSTRACT

A system for controlling the lateral position of a sheet of composite material as the sheet travels longitudinally through a curing oven. The system includes roller guide assemblies along the edges of the sheet. Lateral positioning of the sheet is controlled by varying the gripping of the sheet by the roller assemblies as it travels longitudinally through the oven. The degree of variable gripping is controlled by a feedback system which includes sensors located adjacent to the roller assemblies at spaced locations along the composite sheet material edge as it travels longitudinally through the curing oven.

4 Claims, 3 Drawing Sheets

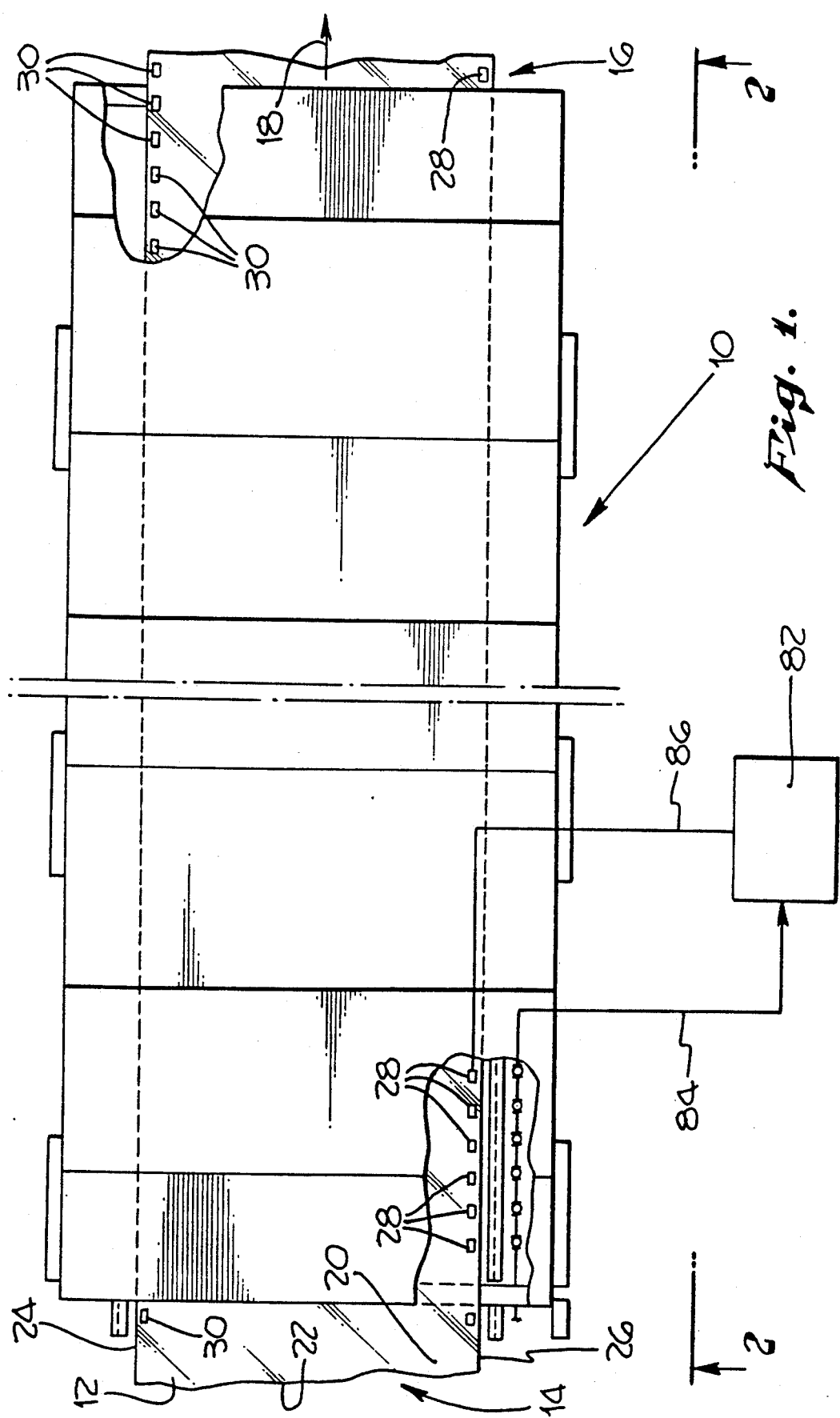

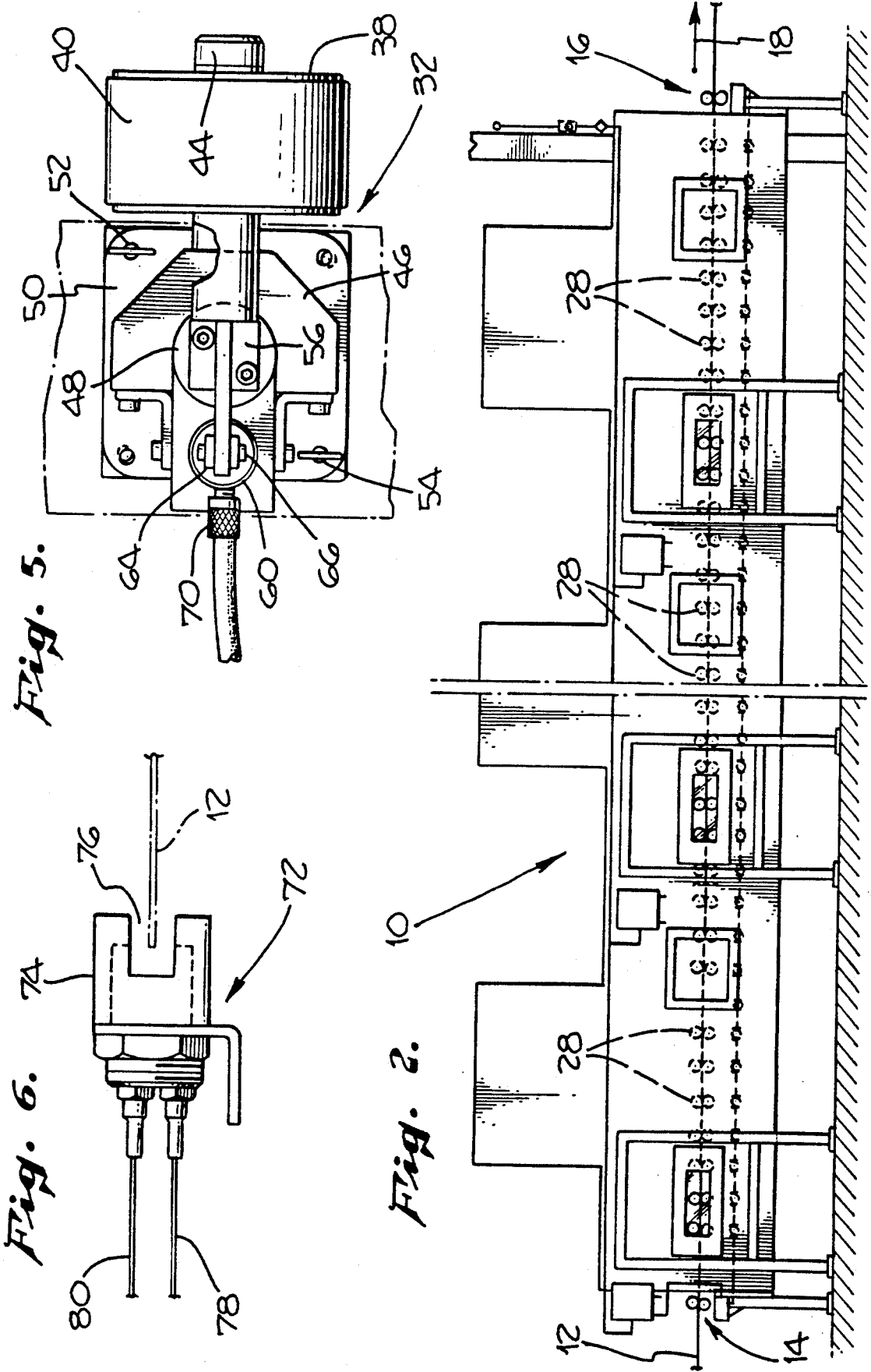

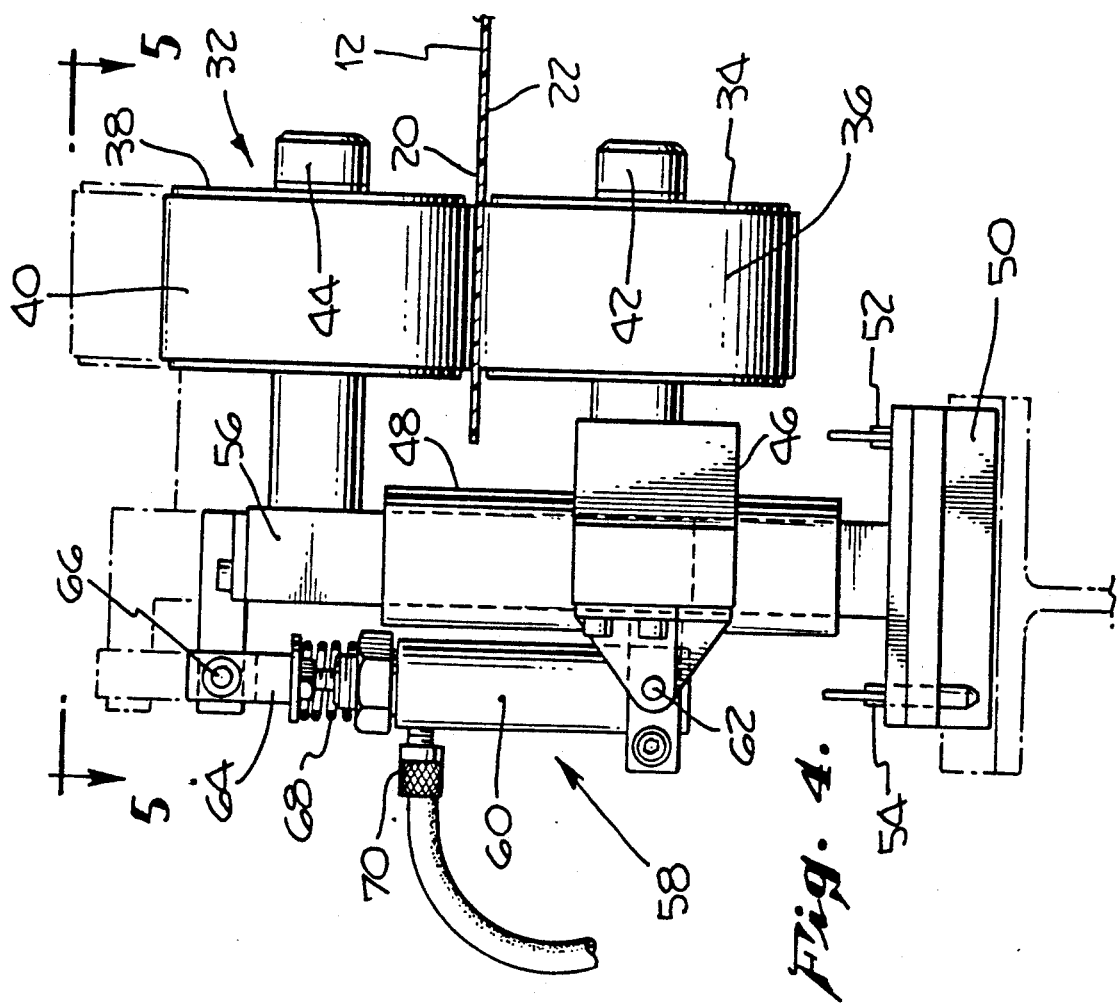
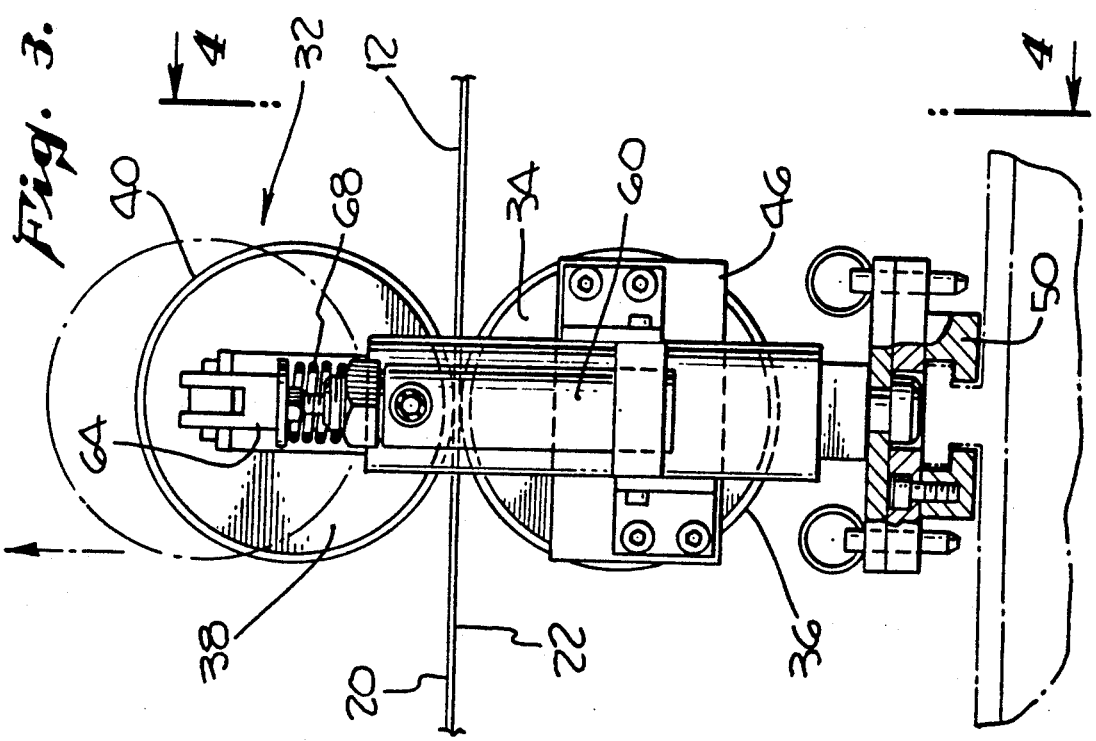

LATERAL TRACKING AND POSITIONING SYSTEM FOR FABRICATION OF COMPOSITE SHEET MATERIAL

BACKGROUND OF THE INVENTION

1. Field of the Invention

The present invention relates generally to systems for manufacturing relatively wide sheets of continuous composite material. More particularly, the present invention relates to a system for controlling the lateral position of a sheet of composite material as it moves longitudinally through a curing oven.

2. Description of Related Art

Large sheets of composite material are used for a wide variety of purposes. These sheets of composite material are typically made from resin impregnated fibers, such as fiberglass. The sheets are available as flat panels or contoured panels which are typically used in constructing patio covers, carports, storage sheds, fences, awnings, dividers and screens, home and industrial greenhouses, wall and truck liners, cabanas, sunrooms, garage doors, and a variety of other applications. Flat and corrugated panels are also widely used as siding for recreational vehicles and vans.

Composite material panels or sheets are typically manufactured as relatively wide continuous sheets which are cut into the desired size panels after fabrication and curing. An exemplary process for such manufacture is described in U.S. Pat. No. 3,077,000 which was issued on Feb. 12, 1963. The basic process disclosed in this patent and utilized in the manufacture of composite material sheeting involves forming a layer of uncured composite material which is supported by a lower support film layer. A top or upper film layer is added to form an uncured sheet of material having the uncured composite material layer sandwiched between the lower support film and upper film. Curing of the composite material is accomplished by transporting the continuous sheet of material through a series of curing ovens. The sheet exits the curing ovens as a completely cured composite panel. At that time, the lower support and upper film layers are removed. The composite sheeting is then cut or otherwise fabricated into the desired panel sizes.

As the relatively wide sheet of composite material pass longitudinally through the curing ovens, it is important to control the lateral position of the sheet so that it does not contact the curing oven walls or other surfaces. Without adequate control of the lateral position, the sheet of composite material tends to wander laterally back and forth causing damage to the sheet edges. Further, it is important when preparing contoured sheets of material that the lateral position of the composite sheet be accurately maintained to prevent misalignment between the composite sheet and the dies used to form the contours.

SUMMARY OF THE INVENTION

In accordance with the present invention, a system is provided which provides accurate control of the lateral position of a sheet of composite material as it travels longitudinally through the curing oven. The system in accordance with the present invention includes roller assemblies spaced longitudinally along the edges of the composite material sheet to provide variable and controllable gripping of the sheet as it moves longitudinally through the curing oven. Sensors are also located along the composite sheet material edges to continually detect the lateral position of the composite sheet edges as the sheet travels through the curing oven. The degree of gripping produced by each roller assembly is controlled by a feedback system which continually varies the degree of gripping by the roller assemblies in response to the lateral position of the composite material sheet as measured by the sensors.

As a feature of the present invention, the roller assemblies include a lower roller having a periphery which contacts the bottom surface of the composite sheet material. The lower roller is mounted on an axle which extends laterally relatively to the longitudinally travelling sheet of composite material. An upper roller is also provided which has a periphery that contacts the upper surface of the composite material sheet. The upper roller is mounted on an upper axle which also extends laterally relative to the longitudinally moving sheet. The two axles are controllably biased together to provide the controllable variations in the gripping of the composite material sheeting as it longitudinally moves through the curing oven.

As another feature of the present invention, the lower and upper rollers are connected together by upper and lower slide members which are telescopically biased inwards to provide the controlled gripping of the composite material sheet edges. The telescopic members are continually biased telescopically apart by a spring. This spring bias is controllably counteracted by a pneumatic actuator system which produces variable degrees of inward bias in excess of the outward spring bias in order to provide varying degrees of gripping of the sheet by the rollers.

As a particular feature, it was discovered that the combined spring and counteracting pneumatic bias provides an especially useful means for quickly and accurately providing variable gripping forces to the composite material sheet edges in order to accurately maintain lateral alignment of the sheeting as it continually moves through the curing oven. The accurate and quick gripping action provided by the roller assembly in response to sensor signals reduces the tendency of the sheet material to deviate from straight longitudinal tracking. This overcomes prior problems in other tracking systems wherein the sheet material tends to wander from side to side due to inefficient or delayed tracking adjustments.

The above-discussed and many other features and attendant advantages of the present invention will become better understood by reference to the following detailed description when taken in conjunction with the accompanying drawings.

BRIEF DESCRIPTION OF THE DRAWINGS

FIG. 1 is a top plan view of a curing oven system which depicts the location of a preferred exemplary lateral position control system in accordance with the present invention.

FIG. 2 is a side view of FIG. 1 taken in the 2—2 plane showing the vertical positioning of the preferred exemplary lateral position control system in accordance with the present invention.

FIG. 3 is a detailed view of a preferred exemplary roller guide assembly in accordance with the present invention.

FIG. 4 is a view of FIG. 3 taken in the 4—4 plane.

FIG. 5 is a view of FIG. 4 taken in the 5—5 plane.

FIG. 6 is a side view of a preferred exemplary sensor for sensing lateral position of the composite material sheet in accordance with the present invention.

DETAILED DESCRIPTION OF THE INVENTION

The present invention involves a system for controlling the lateral position of a sheet of composite material as the sheet is continually transported through a curing oven. The system is designed for lateral positioning of sheets which are being transported through the curing ovens by pultrusion. Although the system is designed for providing lateral positioning in pultrusion type processes, the present invention may also be utilized for providing lateral positioning in extrusion-type processes or systems utilizing transport modes other than pultrusion.

The present invention is especially well-suited for use in controlling the lateral position of relatively wide composite material sheeting as it travels through the curing oven. Such sheeting is generally on the order of 8-12 feet wide and may even be wider. The positioning system of the present invention is intended for use in guiding sheets of fiberglass during the curing process. However, the invention may also be used in guiding sheets of other composite materials including a variety of resin impregnated fibers.

A conventional curing oven which is used in curing wide sheets of composite material is shown generally at 10 in FIGS. 1 and 2. The oven 10 is sufficiently sized to handle sheets of material of up to 10 feet in width. The composite material 12 enters the curing oven 12 at the upstream end 14 and exits the oven 12 at the downstream end 16. The direction which the composite sheet material travels longitudinally through the curing oven 12 is represented by arrow 18. The composite material sheet has a top surface 20, bottom surface 22, left edge 24 and right edge 26.

In accordance with the present invention, a series of roller guide assemblies 28 are provided along the right edge 26 of the sheet 12. The roller guide assemblies 28 provide a means for controllably varying the gripping and tensioning of the sheet 12 along the right edge 26. Left roller guide assemblies 30 are provided along the left edge 24 of sheet 12 to provide a means for controllably varying the gripping and tensioning of sheet 12 along the left edge 24.

The number of right and left roller guide assemblies 28 and 30 required for guiding a particular system depends upon the length of the curing oven, width of the sheet material, thickness of the sheet material and surface traction characteristics. The number of roller guide assemblies will vary widely depending upon a particular application. The number of guide assemblies which are required to provide accurate position control is determined empirically for each curing system. The roller guide assemblies 28 and 30 are typically spaced about 12 inches apart along the sheet edge for sheets having widths on the order of 10 feet.

The right and left roller guide assemblies 28 and 30 are identical. A representative roller guide assembly is shown generally at 32 in FIGS. 3-5. The roller guide assembly 32 or tension means includes a lower roller 34 having a periphery 36 which contacts the bottom surface 22 of the sheet 12. The lower roller 34 may be made from any suitable material which is capable of providing some degree of tension gripping between the roller 34 and bottom surface 22. Suitable materials for roller 34 include metals, plastics and similar materials capable of withstanding temperatures found in conventional curing ovens. The roller assembly 34 and its periphery 36 may be made from the same material. Alternatively, the periphery 36 may be a coating or other layer having desired frictional characteristics to provide traction between the roller periphery 36 and the sheeting bottom surface 22. The diameter of the roller is preferably between about 3 to 4 inches.

The roller guide assembly 32 also includes an upper roller 38 having a periphery 40. It is preferred that the upper and lower rollers 38 and 40 respectively be identical with respect to size, shape and composition.

As best shown in FIG. 4, the lower roller 34 is mounted on lower axle 42 and upper roller 38 is mounted on upper axle 44. Both axles 34 and 44 extend laterally relative to the longitudinally travelling composite sheet 12. The lower axle 42 is mounted by way of bracket 46 to a lower cylinder or slide member 48. The lower cylinder 48 is securely mounted to a roller mounting bracket 50 which is located adjacent to the edge of the composite sheet material. Quick disconnect pins 52 and 54 are used to securely mount the lower cylinder 48 to the mounting bracket 50. The disconnect pins 52 and 54 are provided to allow rapid removal of the roller assembly for maintenance and/or replacement.

The upper axle 44 is mounted to a rod or upper slide member 56. The rod 56 is telescopically mounted within cylinder 48. As shown in phantom in FIGS. 3 and 4, the positioning of the upper roller 38 may be varied by telescopically moving rod 56 outward relative to cylinder 48. Conversely, roller 38 may be moved or biased toward roller 34 by inward telescopic movement of rod 56 with respect to cylinder 48. This inward telescopic movement of rod 56 provides a means for varying the force which is exerted by the two rollers 34 and 38 against each other at their respective peripheries. This inward biasing force provides gripping of the sheet 12.

A pneumatic actuator shown generally at 58 is attached to the cylinder 48 and rod 56 to provide variable biasing of the rollers 34 and 38 together. The pneumatic actuator 58 includes a cylinder 60 which is connected to the lower bracket 46 at 62. The pneumatic actuator 58 also includes a piston assembly 64 which is connected to the upper rod 56 at 66. The piston 64 and cylinder 60 are continually biased apart by spring 68.

The pneumatic actuator 58 includes an air inlet port 70 through which pressurized air is introduced into the pneumatic actuator 58. Pressurization of the pneumatic actuator 58 forces the piston 64 and cylinder 60 telescopically inward. The inward biasing force produced by the actuator depends upon the air pressure at port 70. During operation of the system, the pressure at air inlet port 70 is maintained at a sufficient level so that the inward force exerted on the piston 64 and cylinder 60 is equal to or greater than the outward bias provided by spring 68. When little or no gripping force between rollers 34 and 38 is desired, the air pressure at port 70 is adjusted so that the outward bias force caused by spring 68 is just counter-balanced by the inward pneumatic actuator biasing force.

The gripping force exerted by the various roller assemblies is varied depending upon the lateral position of the sheet at the roller location. Tension or gripping is increased as the sheet moves laterally away from the desired position at the roller location. Sensors 72 are located along at least one edge of the sheet 12 as shown in FIG. 1. The sensors 72 are located adjacent the roller guide assemblies to provide an instantaneous indication of the lateral position of the sheet at a given location. Although any type of suitable position detector may be used, it is preferred that an air gap detector such as the sensor 72 shown in FIG. 6 be used.

The air gap sensor 72 includes a detector head 74 which has a detector opening 76. The detector head 74 includes some type of measurement means for detecting whether or not the composite material sheet 12 is located inside or outside of the detector opening 76. Suitable detector signals used to detect the presence of sheet 12 within opening 76 include light, electromagnetic radiation or an air jet. A particular signal, whether it be based on light or electromagnetic radiation, is input through line 78 with the outgoing signal leaving through output 80. A comparison of the input and output signals provides a means for detecting the presence of sheet 12 within opening 76.

The sensors 72 and roller guide assemblies 28 and 30 are both connected to suitable electronic equipment to provide constant feedback between the sensors and roller guides. The electronic feedback control is shown schematically at 82 in FIG. 1. The feedback control 82 receives input from sensors 72 as represented by line 84. This information is processed and signals are sent to the respective roller guide assemblies as represented by line 86. Such feedback control systems are known and commonly used in many industrial processes.

In operation, as the sheet laterally begins to move out of the sensor opening 76, a signal is immediately sent to the feedback control unit 82 which instructs the respective roller assembly to immediately increase the pneumatically actuated inward biasing of the two rollers together in order to increase gripping of the sheet to prevent further lateral movement. In this way, the lateral position of the longitudinally moving sheet can be accurately controlled. The combination of constant outward spring bias and inward pneumatically actuated variable biasing provides an especially quick and responsive system which responds promptly to signals from the feedback control unit 82. This prompt control response quickly prevents any lateral excursions of the composite sheet material.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A system for controlling the lateral position of a sheet of composite material as said sheet travels longitudinally through a curing oven, said sheet of material having a top surface, bottom surface, left edge and right edge, said system comprising:
   at least one right edge tension means located along the right edge of said sheet for gripping said sheet along said right edge to prevent lateral movement of said right edge;
   at least one left edge tension means located along the left edge of said sheet for gripping said sheet along said left edge to prevent lateral movement of said left edge;
   sensor means for detecting the lateral position of said sheet as said sheet travels longitudinally through said curing oven; and
   feedback means connected between said left and right tension means and said sensor means for controlling the gripping of said sheet by said left and right tension means in response to the lateral position of said sheet to thereby control the lateral position of said sheet as said sheet travels longitudinally through said curing oven;
   said left and right edge tension means comprising: a lower roller having a periphery which contacts the bottom surface of said sheet; a lower axle upon which said lower roller is rotatably mounted, said lower axle extending laterally relative to said longitudinally traveling sheet; an upper roller having a periphery which contacts the upper surface of said sheet; an upper axle upon which said upper roller is rotatably mounted, said upper axle extending laterally relative to said longitudinally traveling sheet; and means for controllably biasing said upper and lower axles together to provide controllable variations in the gripping of said sheet;
   said means for controllably biasing said upper and lower axles together comprising: an upper slide member having an upper end connected to said upper axle; a lower slide member having a lower end connected to said lower axle, said upper and lower slide members being connected together for telescopic movement relative to each other; and
   means for controllably biasing said upper and lower slide members telescopically inward to provide controllable biasing of said upper and lower axles together, said means for controllably biasing said upper and lower slide members telescopically inward comprising: spring bias means for biasing the upper and lower slide members telescopically outward; and controllable pneumatic means for controllably counteracting the outward bias provided by said spring bias means to provide variable biasing of said upper and lower slide members together.

2. A system for controlling the lateral position of a sheet of composite material according to claim 1 wherein said left edge and right edge tension means are spaced laterally at least eight feet apart.

3. A method for controlling the lateral position of a sheet of composite material as said sheet travels longitudinally through a curing oven, said sheet of material having a top surface, bottom surface, left edge and right edge, said method comprising the steps of:
   providing at least one right edge tension means located along the right edge of said sheet for gripping said sheet along said right edge to prevent lateral movement of said right edge;
   providing at least one left edge tension means located along the left edge of said sheet for gripping said sheet along said left edge to prevent lateral movement of said left edge;
   providing sensor means for detecting the lateral position of said sheet as said sheet travels longitudinally through said curing oven; and
   controlling the gripping of said sheet by said left and right tension means in response to the lateral position detected by said sensor means to thereby control the lateral position of said sheet as said sheet travels longitudinally through said curing oven;

said left and right edge tension means comprising: a lower roller having a periphery which contacts the bottom surface of said sheet; a lower axle upon which said lower roller is rotatably mounted, said lower axle extending laterally relative to said longitudinally traveling sheet; an upper roller having a periphery which contacts the upper surface of said sheet; an upper axle upon which said upper roller is rotatably mounted, said upper axle extending laterally relative to said longitudinally traveling sheet; and means for controllably biasing said upper and lower axles together to provide controllable variations in the gripping of said sheet;

said means for controllably biasing said upper and lower axles together comprising: an upper slide member having an upper end connected to said upper axle; a lower slide member having a lower end connected to said lower axle, said upper and lower slide members being connected together for telescopic movement relative to each other; and means for controllably biasing said upper and lower slide members telescopically inward to provide controllable biasing of said upper and lower axles together, said means for controllably biasing said upper and lower slide members telescopically inward comprising: spring bias means for biasing the upper and lower slide members telescopically outward; and controllable pneumatic means for controllably counteracting the outward bias provided by said spring bias means to provide variable biasing of said upper and lower slide members together.

4. A method for controlling the lateral position of a sheet of composite material according to claim 3 wherein said sheet has a lateral width of over eight feet.

* * * * *